(12) United States Patent
Kurebayashi

(10) Patent No.: US 9,187,026 B2
(45) Date of Patent: Nov. 17, 2015

(54) LIGHTING CONTROL SYSTEM FOR VEHICLE LAMP

(71) Applicant: Koito Manufacturing Co., Ltd., Tokyo (JP)

(72) Inventor: Toshihiko Kurebayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 14/053,809

(22) Filed: Oct. 15, 2013

(65) Prior Publication Data

US 2014/0111087 A1 Apr. 24, 2014

(30) Foreign Application Priority Data

Oct. 18, 2012 (JP) ................................. 2012-230491

(51) Int. Cl.
*B60Q 1/04* (2006.01)
*B60Q 1/14* (2006.01)
*B60Q 1/28* (2006.01)

(52) U.S. Cl.
CPC ............... *B60Q 1/04* (2013.01); *B60Q 1/1423* (2013.01); *B60Q 1/28* (2013.01); *B60Q 2400/30* (2013.01)

(58) Field of Classification Search
CPC ..................................................... B60Q 1/04
USPC ..................................................... 315/82, 77
See application file for complete search history.

(56) References Cited

U.S. PATENT DOCUMENTS

| 5,081,565 | A | * | 1/1992 | Nabha et al. | 362/465 |
| 5,614,788 | A |   | 3/1997 | Mullins et al. | |
| 6,262,537 | B1 | * | 7/2001 | Matsumoto | 315/82 |
| 6,947,576 | B2 | * | 9/2005 | Stam et al. | 382/104 |
| 7,830,034 | B2 | * | 11/2010 | Nagasawa et al. | 307/10.8 |
| 2005/0057162 | A1 | * | 3/2005 | Kover et al. | 315/77 |
| 2009/0121651 | A1 | * | 5/2009 | Gandhi | 315/291 |

FOREIGN PATENT DOCUMENTS

| DE | 102011000840 A1 | 8/2012 |
| EP | 1491399 A2 | 12/2004 |
| JP | 2006-62594 | 3/2006 |
| WO | 2012146360 A1 | 11/2012 |

OTHER PUBLICATIONS

European Patent Office, Extended Search Report in EP Application No. 13188664.0-1756 (dated Jan. 31, 2014).

* cited by examiner

*Primary Examiner* — Daniel D Chang
(74) *Attorney, Agent, or Firm* — Fish & Richardson P.C.

(57) ABSTRACT

There is provided a lighting control system of a vehicle lamp. The system includes: a plurality of lamps including: a main lamp; and a separate lamp which is separated from the main lamp; and a lighting controller configured to control lighting of the plurality of lamps. The main lamp includes: a first lamp lighting circuit configured to perform a lighting operation of the main lamp; and a control circuit configured to output a lighting signal based on a lighting control signal output from the lighting controller. The separate lamp includes: a second lamp lighting circuit configured to perform a lighting operation of the separate lamp. The first lamp lighting circuit and the second lamp lighting circuit are configured to perform the lighting operations based on the lighting signal output from the control circuit.

18 Claims, 6 Drawing Sheets

LIGHTING CONTROL SYSTEM FOR VEHICLE LAMP

CROSS-REFERENCE TO RELATED APPLICATION

This application claims priority from Japanese Patent Application No. 2012-230491, filed on Oct. 18, 2012, the entire contents of which are hereby incorporated by reference.

BACKGROUND

1. Technical Field

The present disclosure relates to a lighting control system for controlling lighting on and off and light intensity of a vehicle lamp including a plurality of lamps.

2. Related Art

In general, in addition to a main lamp such as a head lamp (HL), an auxiliary lamp such as a clearance lamp (CLL) or a daytime running lamp (DRL) is provided in an automobile. In recent years, in automobiles, as a lighting control device for the plurality of lamps, a lighting control system which performs a lighting control using a body electronic control unit (ECU) for performing various controls of the automobiles has been suggested. For example, FIG. 6 is a conceptual configuration view of a lighting control system of the HL including the CLL and the DRL, and here, only lamps mounted on one side of the automobile, that is, the left side thereof are shown. In an HL 100, a high beam lamp (HiL) performing illumination by a main beam and a low beam lamp (LoL) performing illumination by a low beam are mounted in one lamp housing, and a DRL/CLL 101 in which the CLL and the DRL are integrally mounted in a separate lamp housing is provided. The HiL has a bulb BUL as the light source, and the LoL has an LED1 (light-emitting diode), which is light-emitted by an LED drive circuit 102, as the light source. Moreover, the CLL and the DRL have one LED2 (light-emitting diode) as a common light source, and the lighting of the CLL or the DRL is controlled as the lamp by switching light intensity at the time of light-emitting of the LED2 by the LED drive circuit 102 used for the low beam lamp LoL.

The lighting controls of the HL 100 and the DRL/CLL 101 are performed by the body ECU (B-ECU) 103. The body ECU 103 generates lighting control signals based on a switching state of a lamp switch SW which is operated by a driver or detected signals of an illuminance sensor S which detects brightness of a running environment of the automobile, and controls four relay switches RL11 to RL14 in a relay box, which is disposed in an engine room, based on the lighting control signals. Each of the relay switches RL11 to RL14 is wire-connected so as to perform ON and OFF controls with respect to power lines L11 to L14 connected to the HiL, LoL, CLL, and DRL, and the body ECU 103 controls each of the relay switches RL11 to RL14 and controls the lighting of each lamp. Right lamps (not shown) are similar to the left lamps. However, here, since each of the left and right lamps is simultaneously controlled by one relay switch, four relay switches RL11 to RL14 can be configured. Accordingly, the size of the relay box in which four relay switches RL11 to R14 are built-in is increased, the number of harnesses, which configure control lines Lc connecting each of the relay switches RL11 to RL14 to the body ECU 103 or power lines L11 to L14 for connecting each of the relay switches RL11 to RL14 to each of lamps HiL, LoL, CLL, and DRL, is significantly increased, and thus, there is a problem that a wiring structure is complicated.

With respect to this, in JP-A-2006-62594 discloses that an electric equipment connector is disposed in each of a plurality of lamps and each electric equipment connector performs the lighting control of each lamp based on signals from a control ECU corresponding to the body ECU. In this disclosure, since each electric equipment connector controls the power source with respect to each lamp, the plurality of relay switches shown in FIG. 6 corresponding to the number of the lamps are not needed. However, instead of this, electric equipment connectors in the number corresponding to the number of the lamps are needed, and thus, a configuration of the system is complicated. Moreover, the number of power lines or control lines which connect the control ECU and each lamp is also increased, and thus, it is difficult to decrease the number of harnesses.

Accordingly, in recent years, a system has been suggested, in which one lamp ECU is disposed in a complex type HL and the lighting controls of the HiL, LoL, CLL, and DRL are performed by the lamp ECU. That is, in this system, relay switches are controlled by signals from the body ECU, power supply to the lamp ECU is controlled, and simultaneously, the lamp ECU performs the lighting control of each lamp by lighting control signals from the body ECU. Since only one relay switch is provided for the HL, a reduction in the size is possible, the body ECU and the lamp ECU, that is, the complex type HL may be connected by one power line and one control line, and thus, the number of harnesses is decreased, and the wiring structure can be simplified.

However, this technology can be applied to a lamp in which a plurality of lamps are assembled in one lamp housing as one complex type lamp. However, in a case where the plurality of lamps are configured as an independent lamp, for example, as shown in FIG. 6, in the case where the CLL and DRL are integrated and configured of a lamp (hereinafter, referred to as C/DL) separate from the HL, the lighting control of the separate C/DL cannot be performed by the lamp ECU built in the HL. Accordingly, although one power line can be configured with respect to the HiL and the LoL configuring the HL, with respect to the C/DL, the power lines are needed to be connected to the CLL and the DRL via relay switches respectively, and as a result, a total of three relay switches and three power lines are needed, and it is difficult to decrease the number of harnesses (see e.g., JP-A-2006-62594).

As described above, in the lighting control system of the related art, there is a problem that the number of the relay switches or the number of the harnesses of the power lines, the control lines, and the like is increased in accordance with the number of the lamps. Even in a case where the lamp ECU is provided and the lighting is collectively controlled, in order to solve the problems, there is a problem that reduction effects in the number of the relay switches or reduction effects in the number of harnesses cannot be obtained when some lamps are configured as the separate lamps, and there is a problem that simplification or a reduction of cost of the lighting control system is not easily realized.

SUMMARY OF THE INVENTION

One of aspects of the present invention is to provide a lighting control system for a vehicle lamp which reduces the number of components, decreases the number of harnesses so as to achieve simplification and reduction in cost of a system configuration.

According to one or more aspects of the present invention, there is provided a lighting control system for a vehicle lamp. The system includes: a plurality of lamps including: a main lamp; and a separate lamp which is separated from the main lamp; and a lighting controller configured to control lighting of the plurality of lamps. The main lamp includes: a first lamp lighting circuit configured to perform a lighting operation of the main lamp; and a control circuit configured to output a lighting signal based on a lighting control signal output from the lighting controller. The separate lamp includes: a second lamp lighting circuit configured to perform a lighting operation of the separate lamp. The first lamp lighting circuit and the second lamp lighting circuit are configured to perform the lighting operations based on the lighting signal output from the control circuit.

According to one or more aspects of the present invention, the main lamp further comprises a first semiconductor light emitting element as a light source, and the separate lamp further comprises a second semiconductor light emitting element as a light source. The first lamp lighting circuit is a first light emitting drive circuit for emitting the first semiconductor light emitting element, and the second lamp lighting circuit is a second light emitting drive circuit for emitting the second semiconductor light emitting element. The first light emitting drive circuit has the same configuration as the second light emitting drive circuit.

According to one or more aspects of the present invention, the separate lamp comprises a first separate lamp and a second separate lamp, wherein the first separate lamp and the second separate lamp uses the same light source, and the light intensity of the first separate lamp is different from that of the second separate lamp. The lighting signal output from the control circuit is a modulated signal. The second lamp lighting circuit is configured to perform the lighting operations of the first separate lamp and the second separate lamp such that the light intensity of the first separate lamp is different from that of the second separate lamp, based on the lighting signal.

According to one or more aspects of the present invention, a common power line is connected to the main lamp and the separate lamp, and the lighting controller is configured to control ON and OFF of the common power line.

According to one or more aspects of the present invention, the main lamp and the lighting controller are connected to each other by a main lighting control line which transmits the lighting control signal. The main lamp and the separate lamp are connected to each other by a secondary lighting control line which transmits the lighting signal.

According to one or more aspects of the present invention, the first lamp lighting circuit and the control circuit are integrally configured as a lamp controller.

According to the present invention, one or two power lines, which are divided to the first lamp lighting circuit of the main lamp and the second lamp lighting circuit of the separate lamp, are connected, the lighting controller is connected to the control circuit of the main lamp by one main lighting control line, the control circuit is connected to the second lamp lighting circuit of the separate lamp by one secondary lighting control line. Thus, the lighting control of the plurality of lamps can be realized. Accordingly, the number of harnesses for connecting the light controller and the each lamp is decreased, simplification of a configuration of the system is improved, and the system can be easily constructed.

According to the present invention, since the first lamp lighting circuit and the second lamp lighting circuit are configured of a light emitting element drive circuit having the same configuration for emitting each semiconductor light emitting element, each lamp lighting circuit can be configured using the same drive circuit, and the types of components can be reduced.

According to the present invention, since the modulated lighting signals are output from the control circuit of the main lamp and the second lamp lighting circuit makes the light source of the separate lamp emit light with a different light intensity by the lighting signals, a plurality of lamps using the common light source and the common lamp lighting circuit can be configured, and the number of components can be reduced.

According to the present invention, since the main lamp and the separate lamp includes a common power line and the lighting controller is configured to control ON and OFF of the common power line, the number of the power lines can be reduced. Moreover, since the main lamp and the lighting controller are connected to each other by a main lighting control line which transmits the lighting control signals, and the main lamp and the separate lamp are connected to each other by a secondary lighting control line which transmits the lighting signals, the number of the lighting control lines can be reduced.

In addition, since the first lamp lighting circuit and the control circuit are integrally configured as lamp controller, the number of components can be reduced.

DETAILED DESCRIPTION

Figure 1:
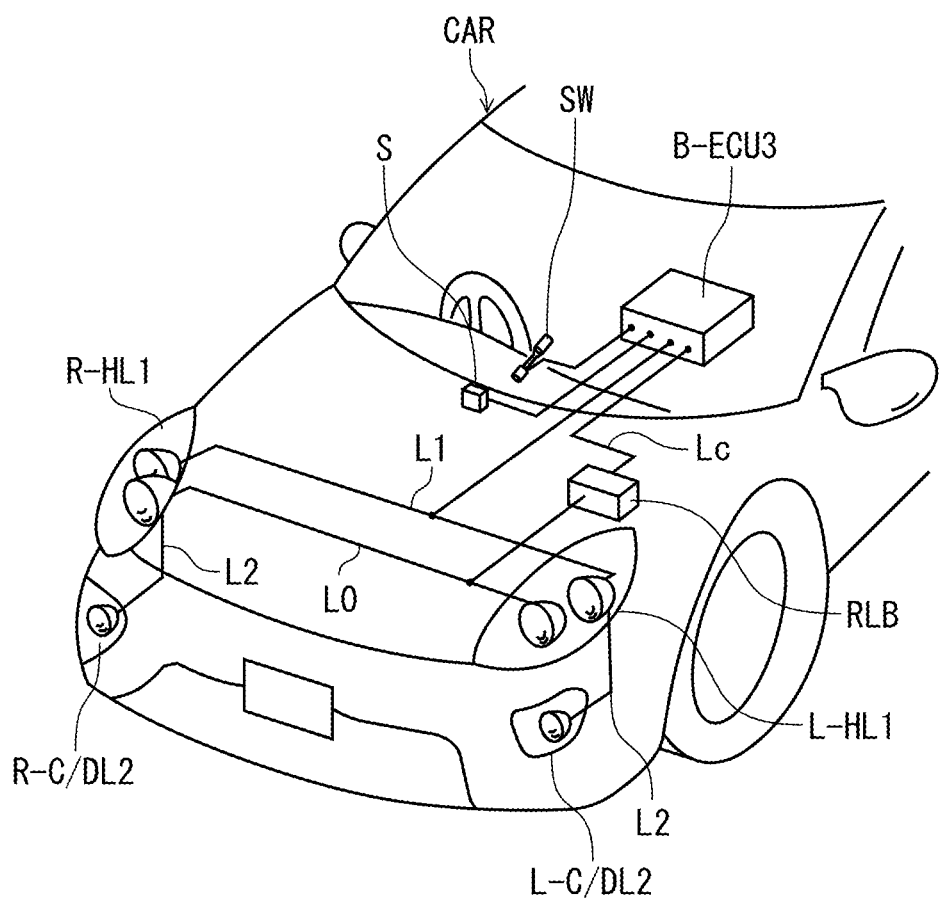
FIG. 1 is a schematic perspective view of an example of an automobile mounted with a lamp lighting control system of the present invention.
Figure 2:
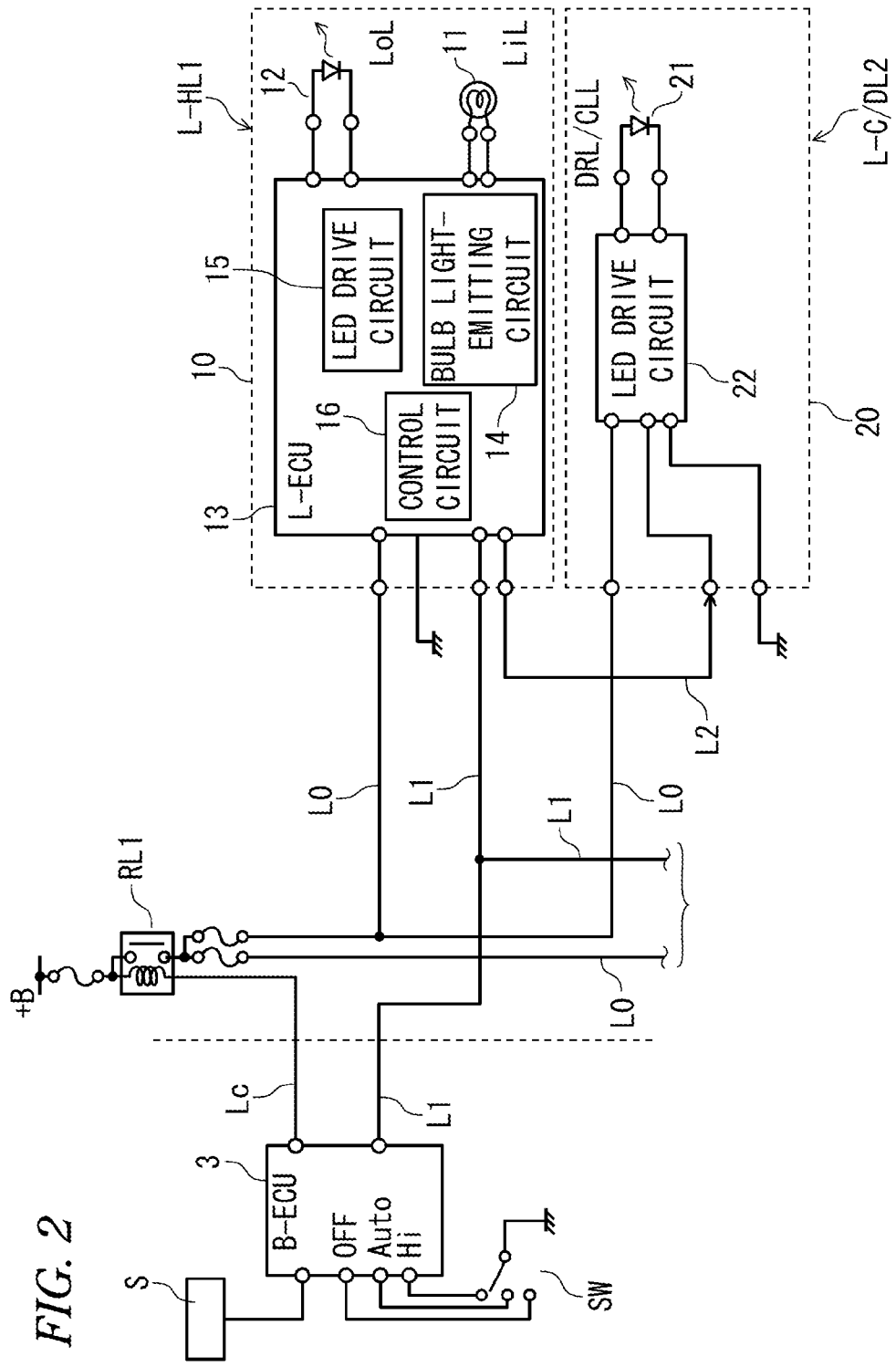
FIG. 2 is a block diagram of an embodiment of the lighting control system of the present invention.

Next, an embodiment of the present invention will be described with reference to the drawings. FIG. 1 is a schematic perspective view of an automobile CAR mounted with a lighting control system of the present invention. FIG. 2 is a block diagram of the lighting control system. As shown in FIG. 1, a vehicle lamp according to the present invention includes left and right HL1 (head lamp: headlight), that is, an L (left)-HL and an R (right)-HL as a main lamp. Moreover, as a separate lamp, auxiliary left and right lamps 2 (here, referred to as L-C/DL and R-C/DL) are provided in which a CCL (clearance lamp: side marker lamp) and a DDL (daytime running lamp: day run lamp) are integrally mounted. The L-HL and the R-HL are disposed in the left and right sides of a front surface of the automobile CAR respectively, and the L-C/D and the R-C/DL are separated from the R-HL and the L-HL respectively and are disposed in the left and right sides of a front bumper of the automobile CAR respectively. Moreover, a lighting control of each of the lamps R-HL, L-HL, R-C/DL, and L-C/DL is performed by a body ECU (B-ECU) 3 which is provided in a portion of an interior side of the automobile CAR. The body ECU 3 is a lighting controller of the present invention, a lamp switch SW provided in a driver seat and an illuminance sensor disposed at a predetermined position of the automobile are connected to the body ECU 3, and the body ECU 3 performs the lighting control based on an operation of the lamp switch SW and a detected output of the illuminance sensor.

In the L-HL and the R-HL which are the main lamps, an L-HL1 is shown as the representative in FIG. 2, and in FIG. 2, a HiL (high beam lamp: main lamp) and a LoL (low beam lamp: low lamp) are integrally incorporated in one lamp housing 10. The HiL is a lamp which has a halogen bulb or a discharge bulb 11 as the light source, and the LoL is a lamp which has an LED (light-emitting diode) 12 as the light source. Moreover, the LED 12 is referred to as a first LED. Moreover, one lamp ECU 13 which configures lamp controller of the present invention is built in the lamp housing 10 of the L-HL, and the lighting of the HiL and the LoL is controlled by the lamp ECU 13. The lamp ECU 13 includes a control circuit 16 described in detail below, a bulb light-emitting circuit 14 for allowing the bulb 11 to emit light, and a first LED drive circuit 15 for allowing the first LED 12 to emit light. The first LED drive circuit 15 configures a first lamp lighting circuit in the present invention.

In the L-C/DL and R-C/DL which are separate lamps, an L-C/DL2 is shown as the representative in FIG. 2, and in FIG. 2, one LED 21, which is configured to be used for both of the CLL and the DRL and is a light source, is built in a lamp housing 20. The LED 21 is referred to as a second LED. Here, the C/DL2 is lighted as the DRL when the second LED 21 is light-emitted with high light intensity, and the C/DL2 is lighted as the CLL when the second LED 21 is light-emitted with low light intensity which is relatively lower than the high light intensity. Moreover, a second LED drive circuit 22, which performs an operation for allowing the second LED 21 to emit light, is disposed in the lamp housing 20. The second LED drive circuit 22 configures a second lamp lighting circuit in the present invention.

The body ECU 3, which is lighting controller of the present invention, is connected to one relay switch RL1, which is positioned at a position near the L-HL1 or the L-C/DL2, for example, in a relay box RLB disposed in an engine room as shown in FIG. 1, by a power source control line Lc, and the body ECU 3 can perform ON and OFF controls of the relay switch RL1 through the power source control line Lc. The relay switch RL1 is connected to a power line L0 which connects an on-vehicle battery (+B) (not shown) and the lamp ECU 13 of the L-HL1, and the relay switch RL1 is controlled to be turned on and off and supplies electric power of the on-vehicle battery to the lamp ECU 13. A portion of the power line L0 is divided and connected to the L-C/DL2. Moreover, the body ECU 3 is connected to the lamp ECU 13 by a main lighting control line L1 and outputs lighting control signals, which are generated in the body ECU 3, to the lamp ECU 13 through the main lighting control line L1, and the lighting control in the lamp ECU 13 can be performed.

The illuminance sensor S connected to the body ECU 3 detects illuminance of a region in which the vehicle itself runs, and the body ECU 3 determines which of a "bright environment", a "dim environment", or a "dark environment" is a running environment of the vehicle based on the detected output of the illuminance sensor S. The brightness of the environment is an order of "the bright environment>the dim environment>the dark environment". Moreover, here, the lamp switch SW connected to the body ECU 3 can be switched to "OFF", "Auto", and "Hi".

Figure 3:
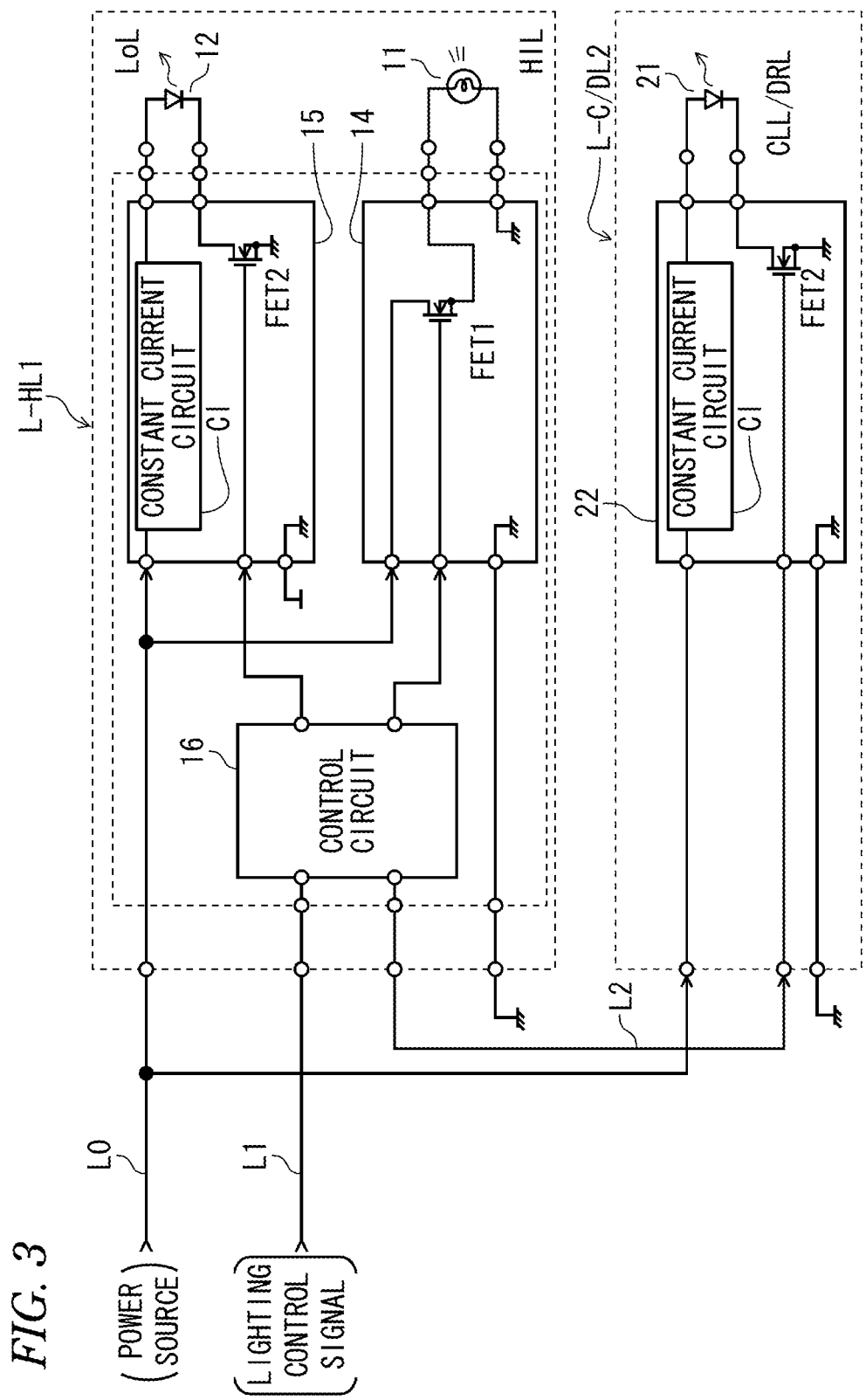
FIG. 3 is a block diagram of a main portion of the lighting control system of the present invention.

FIG. 3 is a block diagram which shows configurations of the inner portions of the L-HL1 and the L-C/DL2 in detail. As described above, the lamp ECU 13 which is built in the L-HL1 includes a bulb light-emitting circuit 14 for controlling the light-emitting of the bulb 11 which is the Hi light source, a first LED drive circuit 15 for performing the lighting control of a first LED 12 which is the Lo light source, and a control circuit 16 which performs each of the lighting controls of the bulb light-emitting circuit 14 and the first LED drive circuit 15 based on the lighting control signals output from the body ECU 3. For example, the control circuit 16 is configured of a microcomputer, when the lighting control signals are input from the body ECU 3, the control circuit 16 performs a predetermined calculation, generates lighting signals corresponding to the lighting control signals, drives the bulb light-emitting circuit 14 and the first LED drive circuit 15 by lighting signals, and allows the bulb 11 and the first LED 12 to emit light.

The bulb light-emitting circuit 14 includes a switching element FET1 which is configured of a power FET or the like which is operated to be turned on and off by lighting signals from the control circuit 16, and the bulb light-emitting circuit 14 is connected between the bulb 11 and the power source. When the switching element FET1 is turned on by the lighting signals of the control circuit 16, the switching element supplies the electric power of the power source to the bulb 11 and makes the bulb 11 emit light. Moreover, a discharge bulb can be also used as the Hi light source, and in this case, the bulb light-emitting circuit 14 is configured of a circuit which lights the discharge bulb. However, also in this case, the lighting is controlled by lighting signals from the control circuit 16 when the lighting is performed.

The first LED drive circuit 15 includes a constant current circuit CI which generates constant current based on the input electric power and a switching element FET2 which is configured of a FET or the like which is operated to be turned on and turned off by the lighting signals from the control circuit 16, and the constant current circuit CI and the switching element FET2 are connected to the first LED 12 in series. When the switching element FET2 is turned on by the lighting signals of the control circuit 16, the switching element supplies the constant current to the first LED 12 and makes the first LED emit light.

A second LED drive circuit 22 for performing the lighting control of the second LED 21 is provided in the lamp housing 20 of the L-C/DL2. The second LED drive circuit has the same configuration as that of the first LED drive circuit 15 which is provided in the lamp ECU 13 of the L-HL1. That is, the LED drive circuit used when the lamp ECU 13 is assembled is used as it is. Moreover, the second LED 21 which is the light source of the L-C/DL2 is connected to the constant current circuit CI and the switching element FET2 of the second LED drive circuit 22. Moreover, the switching element FET2 is connected to the control circuit 16 in the lamp ECU 13 of the L-HL1 via a secondary lighting control line L2 and is controlled to be turned on and turned off by the lighting signals from the control circuit 16. In the second LED drive circuit 22, the constant current, which is generated by the constant current circuit CI when the switching element FET2 is turned on, is supplied to the second LED 21, and thus, the second LED can emit light.

Moreover, although it is not shown, the right R-HL and the right R-C/DL are disposed in a symmetrical manner with respect to the L-HL and L-C/DL in a state where the R-HL and the R-C/DL are mounted on the automobile CAR, and the circuit configurations of the R-HL and the R-C/DL are the same as those of the L-HL and L-C/DL. Moreover, the power line L0 from the relay switch RL1 shown in FIG. 2 is connected to the R-HL and the R-C/DL, and the main lighting control line L1 from the body ECU 3 is connected to the R-HL. Moreover, the R-HL and the R-C/DL are connected to each other by the secondary lighting control line L2.

Figure 4:
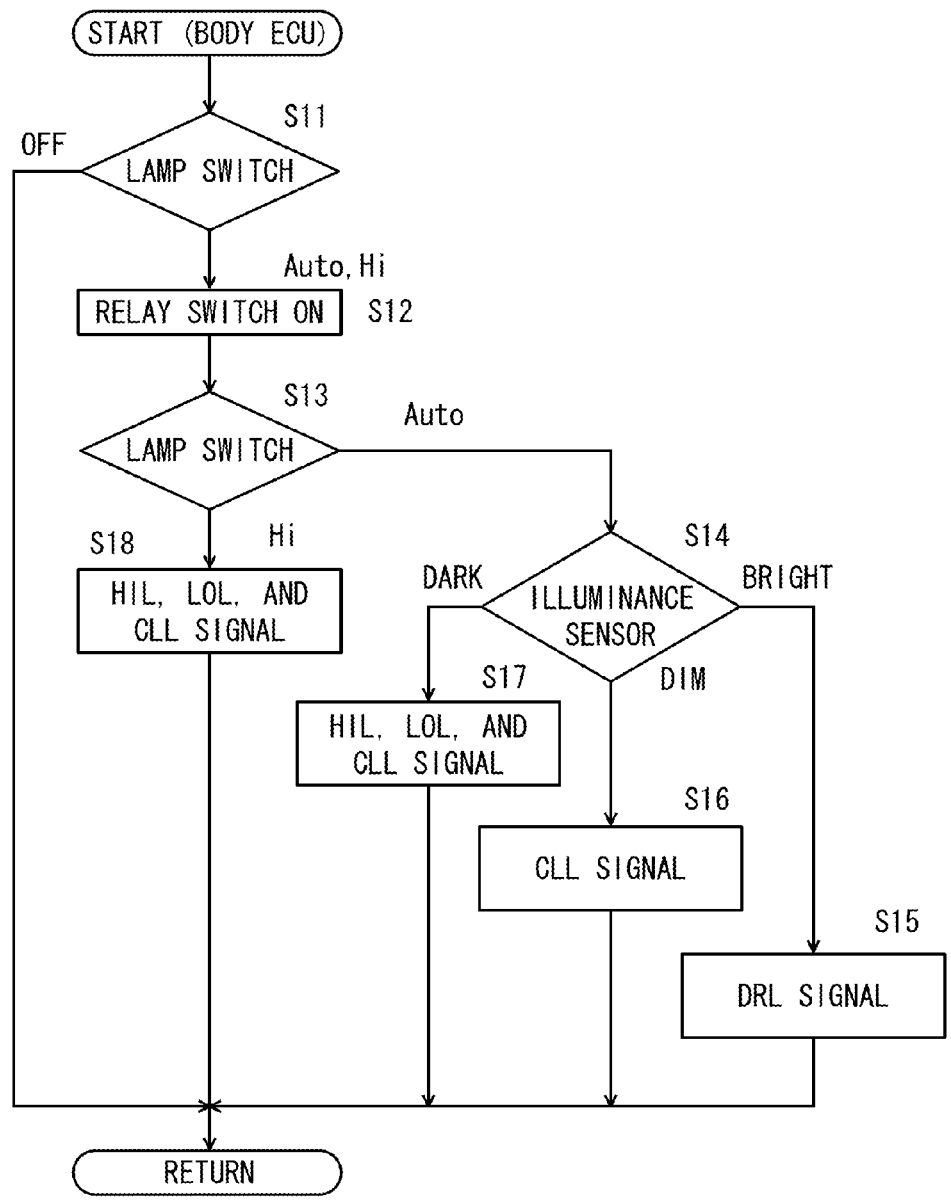
FIG. 4 is a flowchart explaining an operation of a body ECU.

Next, the lighting control in the above-described lighting control system will be described. FIG. 4 is a flowchart explaining the operation of the body ECU 3. If the body ECU 3 determines whether or not the lamp switch SW is switched from "OFF" to "Auto" or "Hi" (S11), control signals are output to the relay switch RL1 via the control line Lc, the relay switch RL1 is turned on, and the electric power of the on-vehicle battery is supplied to each of the left and right HL1 and C/DL2 (S12).

Subsequently, if it is determined that the lamp switch SW is "Auto" (S13), it is determined which of the "bright environment", the "dim environment", or the "dark environment" corresponds to the brightness of the environment in vicinity of the vehicle based on the detected output of the illuminance sensor S(S14). When the brightness of the environment is determined to be the "bright environment", DRL signals which light the DRL are output as the lighting control signals (S15). When the brightness of the environment is determined to be the "dim environment", CLL signals which light the CLL are output as the lighting control signals (S16). When the brightness of the environment is determined to be the "dark environment", the CLL signals and the LoL signals which light the LoL are output as the lighting control signals (S17). On the other hand, when it is determined that the lamp switch SW is "Hi" in the step S13, HiL signals which light the HiL in addition to the CLL signals and LoL signals are output as the lighting control signals (S18).

Figure 5:
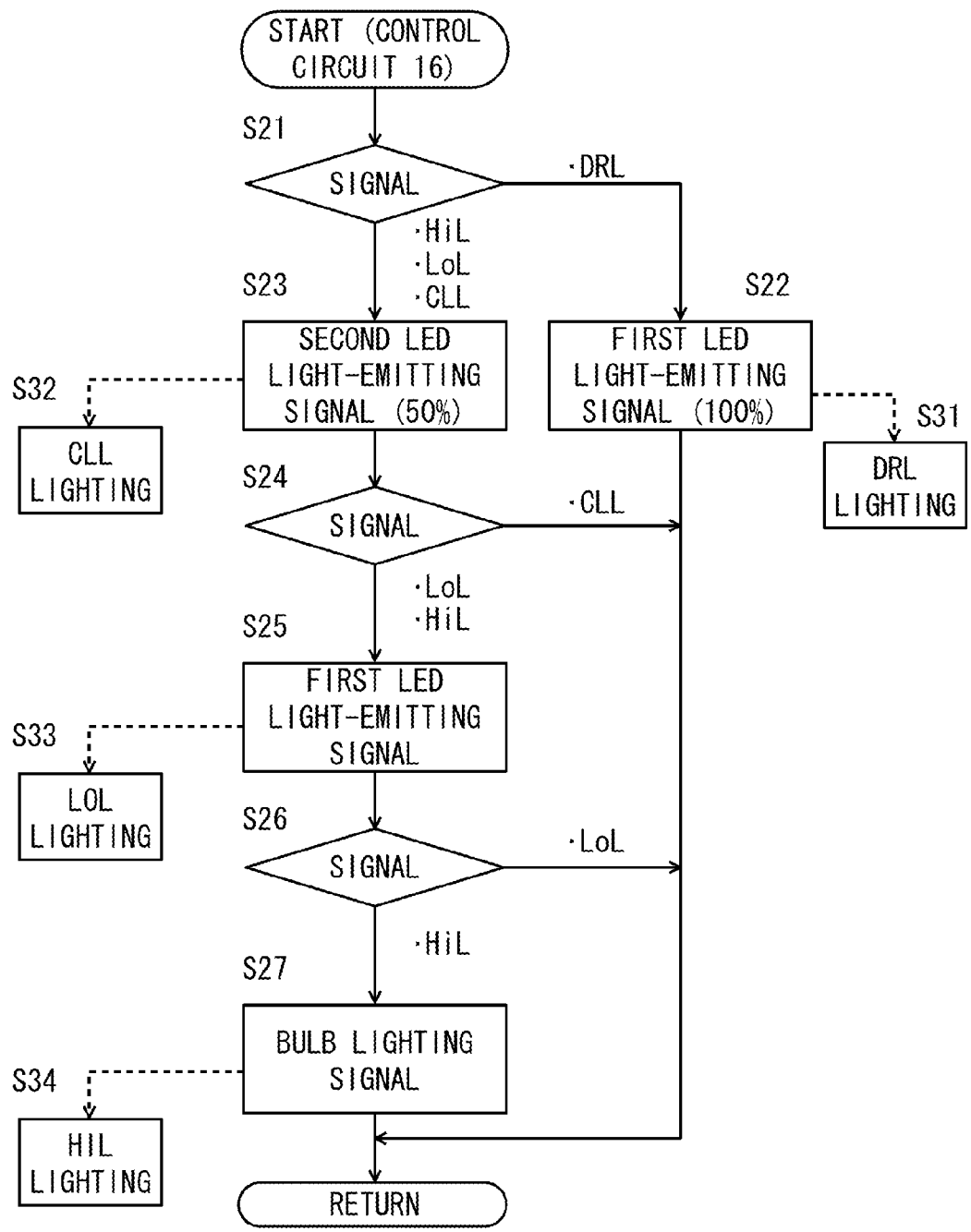
FIG. 5 is a flowchart explaining an operation of a lamp ECU.
Figure 6:
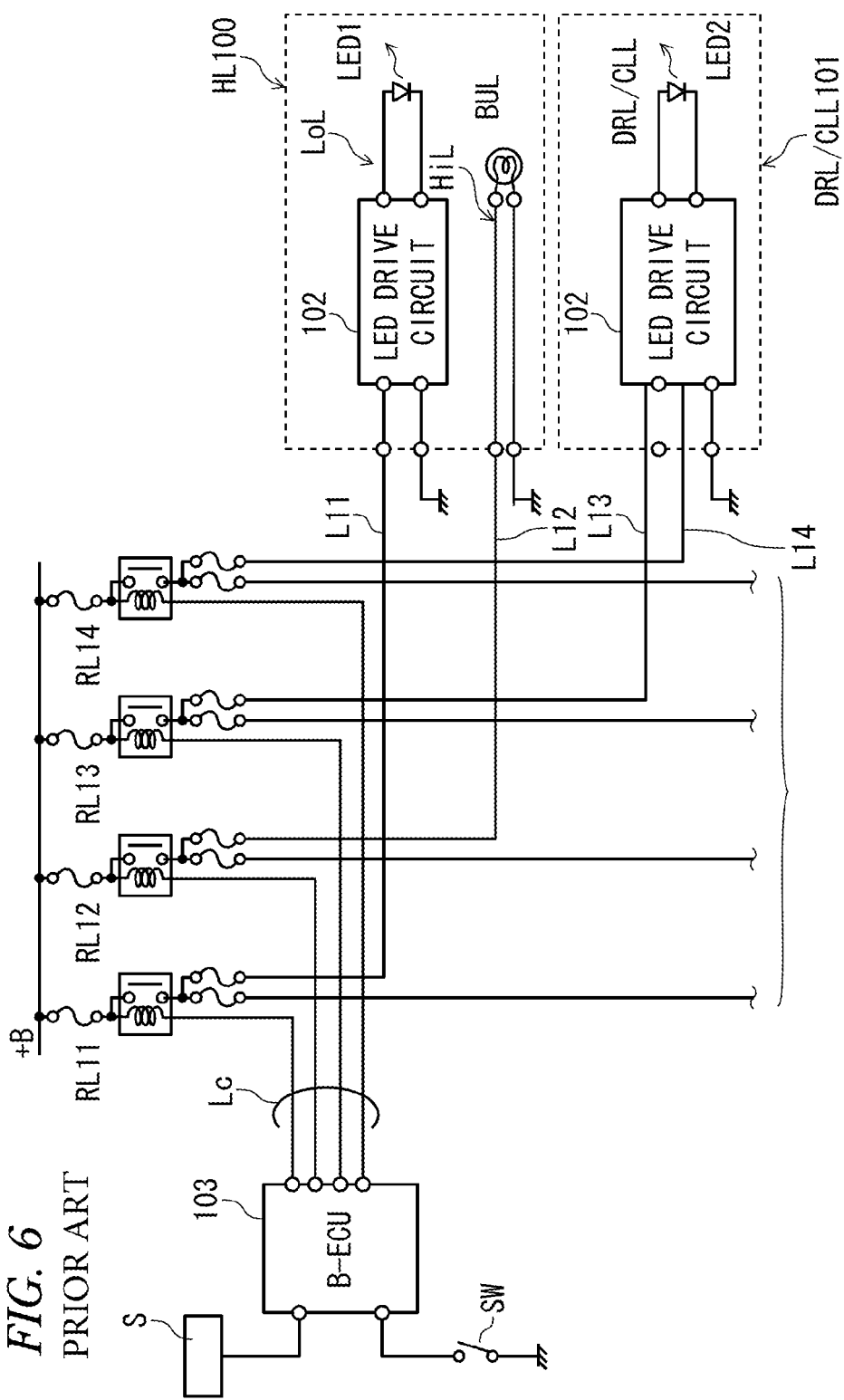
FIG. 6 is a block diagram of a lighting control system in the related art.

In this way, the lighting control signals which are output from the body ECU 3 are input to the lamp ECU 13 of the HL1 through the main lighting control line L1. FIG. 5 is a flowchart showing the operation of the lamp ECU 13. The lamp ECU 13 determines the input light control signals (S21), and when the lighting control signals are the DRL signals, second LED light-emitting signals (100%), which allow the second LED 21 of the C/DL2 to emit light by a duty ratio of 100% and to which PWM (Pulse Width Modulation) is applied, are generated and output (S22). Moreover, in the step S21, when the lighting control signals are any one of the CLL signals, the LoL signals, and the HiL signals, the second LED light-emitting signals (50%), which allow the second LED 21 of the C/DL2 to emit light by the duty ratio of 50% and the PWM is applied, are generated and output (S23).

Subsequently, the light control signals are determined again (S24), when the lighting control signals are either the LoL signals or the HiL signals, first LED light-emitting signals which allow the first LED 12 of the HL1 continuously to emit light are generated and output (S25). Moreover, the lighting control signals are determined (S26), and when the lighting control signals are the HiL signals, bulb light-emitting signals which make the bulb 11 of the HL1 emit light are generated and output (S27).

Moreover, according to the lighting control signals from the lamp ECU 13, when the second LED light-emitting signals (100%) are output in the step S22, the second LED 21 of the C/DL2 is light-emitted with high light intensity, and the C/DL2 is lighted as the DRL (S31). When the second LED light-emitting signals (50%) are output in the step S23, the second LED 21 of the C/DL2 is light-emitted with low light intensity, and the C/DL2 is lighted as the CLL (S32). When the first LED light-emitting signals are output in the step S25, the first LED 12 of the HL1 is light-emitted with a predetermined light intensity and lights the LoL (S33). When bulb lighting signals are output in the step S27, the bulb 11 of HL1 is light-emitted and lights the HiL (S34).

Next, the above-described lighting controls will be described respectively. When the lamp switch SW is set to "Auto", if the DRL signals are input to the lamp ECU 13, the control circuit 16 generates the second LED light-emitting signals (100%), and the light-emitting signals are output to the second LED drive circuit 22 of the C/DL2 through the secondary lighting control line L2. As described above, the second LED light-emitting signals are PWM signals in which the pulse widths are modulated, and the signals turns on the switching element FET2 only at the time of a high level. Moreover, the second LED light-emitting signals (100%) are the second LED light-emitting signals in which the duty ratio is 100%, that is, in which the level is a high level at all times. In the second LED drive circuit 22, the constant current is generated in the constant current circuit CI by the input electric power and is supplied to the second LED 21. However, the switching element FET2 is controlled to be continuously turned on by the input second LED light-emitting signals (100%). Accordingly, the second LED 21 is light-emitted with a predetermined light intensity, and the C/DL2 is lighted as the DRL.

If CLL signals are input to the lamp ECU 13, the control circuit 16 generates the second LED light-emitting signals (50%), and the light-emitting signals are output to the second LED drive circuit 22 of the C/DL2 through the secondary lighting control line L2. The second LED light-emitting signals (50%) are light-emitting signals in which the duty ratio is 50%, that is, a high level is ½ time. In the second LED drive circuit 22, the constant current is generated in the constant current circuit CI by the input electric power and is supplied to the second LED 21. However, the switching element FET2 is controlled to be intermittently turned on by the input second LED light-emitting signals (50%). Accordingly, since the switching element FET2 is turned on by the time corresponding to the duty ratio of the CLL signals, that is, by ½ time compared to the case of the DRL signals, the second LED 21 is light-emitted with the light intensity which is further reduced than the light-emitting of DRL, and thus, C/DL2 is lighted as the CLL. Moreover, with respect to the duty ratios of 100% and 50%, it is needless to say that the invention is not limited to the values of the embodiment.

If the LoL signals are input to the lamp ECU 13, the control circuit 16 generates first LED light-emitting signals, and the light-emitting signals are output to the first LED drive circuit 15. In the first LED drive circuit 15, the constant current is generated in constant current circuit CI by the input electric power and is supplied to the first LED 12. The switching element FET2 is controlled to be continuously turned on by the input first LED light-emitting signals. Accordingly, the first LED 12 is light-emitted with a predetermined light intensity and the LoL is lighted. At this time, as described above, in the C/DL2, the second LED 21 is light-emitted with low light intensity based on the CLL signals, and the CLL is lighted. Accordingly, a certain low beam distribution is obtained by lighting of both lamps of the LoL and the CLL.

If the HiL signals are input to the lamp ECU 13, the control circuit 16 generates bulb light-emitting signals, and the light-emitting signals are output to the bulb light-emitting circuit 14. In the bulb light-emitting circuit 14, the switching element FET1 is turned on, and the input electric power is supplied to the bulb 11. According to this, the bulb 11 is light-emitted with a predetermined intensity, and the HiL is lighted. At this time, as described above, in the C/DL2, the second LED 21 is light-emitted with low light intensity based on the CLL signals, the CLL is lighted, and simultaneously, in the HL, the first LED 12 is light-emitted with a predetermined light intensity. Accordingly, in addition to the lighting of the HiL, a certain high beam distribution is obtained by the lighting of both lamps of the LoL and the CLL.

As described above, in the lighting control system of this embodiment, the HiL, LoL, CLL, and DRL can be lighted to be switched, and even when the CLL, the DRL, and the HL are configured of separate lamps and the lighting controls of the CLL and DRL are performed independently, the number of the relay switches disposed in the relay box is decreased, and the number of the harnesses configuring lines or control lines can be decreased. That is, as shown in FIG. 2, since simultaneous supplying of the power to all the left and right HL1 and C/DR2 can be achieved by only providing one relay switch RL1 and two or one divided power line L0 connected to each HL, a reduction in the size of the relay box is realized, and the number of the power lines LO can be the minimum number. Moreover, in the body ECU 3, the connection with respect to one relay switch RL1 can be achieved by only connecting one control line Lc. Moreover, since the relay switch RL1, the left and right HL1, and the left and right C/DL2 are disposed at positions close to one another in the engine room of the automobile, the length of the power line L0 can be shortened. Accordingly, in the lighting control system in which the body ECU 3, the relay switches RL1, HL1, and C/DL2 are away from one another, the number of the relay switches can be decreased, and the number of the power lines connecting the relay switches can be decreased.

Moreover, the connections between the body ECU 3 and the left and right HL1 can be achieved by only connecting one divided main lighting control line L1, and the connections between the left and right HL1 and the C/DR2 can be achieved by only connecting to each other by one secondary lighting control line L2 respectively. Accordingly, the number of the main lighting control lines L1 connecting the body ECU 3 and the HL1 can be the minimum number, and the secondary lighting control lines L2 may be provided one by one in the left and right respectively. Therefore, the total number of the main and secondary lighting control lines L1 and L2 are decreased, the total extension length of the lines can be shortened, and simplification of the configuration of the system can be achieved, and a reduction in cost can be realized.

Moreover, since the configuration of the first LED drive circuit 15 of the lamp HL1 which is a main lamp is the same as that of the second LED drive circuit 22 of the lamp C/DL2 which is a separate lamp, the first LED drive circuit 15 configuring the lamp ECU 13 of the HL1 can be used for the second lamp ECU 22 of the C/DL. Accordingly, the first and second LED drive circuits, that is, the first and second lamp lighting circuits of the present invention can be configured using the same LED drive circuit, and the types of components can be reduced. Moreover, in the lamp ECU 13 which is provided in the lamp HL1 which is the main lamp, since the first LED drive circuit 15 and the control circuit 16 are integrally configured, a reduction in the size of the lamp ECU 13 can be realized, and a reduction in the size of the HL1 can be achieved. Moreover, in this embodiment, since the bulb lightemitting circuit 14 is integrally configured to the lamp ECU 13, a further reduction in the size of the HL1 can be realized.

In the embodiment, the light source HiL of the lamp HL1 is a bulb. However, the light source may be an LED. In this case, the light source can be light-emitted using the same LED drive circuit as the first LED drive circuit 15, and the configuration of the lamp ECU 13 can be further simplified, and a reduction in the size of the lamp ECU 13 can be realized. On the other hand, the light source LoL of the lamp HL1 is an LED. However, the light source LoL may be a bulb. In this case, the LED drive circuit in each lamp, that is, the lamp drive circuit in the present invention may be replaced by the lamp lighting control circuit which can control the light intensity of the bulb. This is also applied to the separate lamp C/DL in the same manner.

In the embodiment, the lamp C/DL used for both of the CLL and the DRL is configured as the separate lamp in addition to the lamp HL which is the main lamp. However, in the present invention, the main lamp HL and the separate lamp C/DL are not limited to the above-described lamps, and may be also similarly be applied to other lamps which are disposed in the automobile. Moreover, in the body ECU 3, according to the switching of the lamp switch SW, each lighting of the HiL, the LoL, the DRL, and the CLL can be switched manually. It is needless to say that the above-described matters are also similarly applied to a case where the separate lamps are configured of lamps different from those of the embodiment.

The present invention is not limited to each embodiment described above, the embodiments can be combined respectively, modifications such as various design modifications can be applied based on knowledge of a person skilled in the art, and the combined embodiments or the modified embodiments are also included in the scope of the present invention. The above-described embodiments and new embodiments generated by combining the embodiments and modifications have effects of each of the combined embodiments and modifications.

What is claimed is:

1. A lighting control system for a vehicle lamp, the system comprising:
   a plurality of lamps comprising:
      a main lamp; and
      a separate lamp which is separated from the main lamp;
   a lighting controller configured to control lighting of the plurality of lamps; and
   a relay switch coupled to each of the plurality of lamps, wherein the relay switch is configured to provide power to the plurality of lamps based on a relay signal output from the lighting controller,
   wherein the main lamp comprises:
      a first lamp lighting circuit configured to perform a lighting operation of the main lamp; and
      a control circuit configured to output a lighting signal based on a lighting control signal output from the lighting controller,
   wherein the separate lamp comprises:
      a second lamp lighting circuit configured to perform a lighting operation of the separate lamp, and
   wherein the first lamp lighting circuit and the second lamp lighting circuit are configured to perform the lighting operations based on the lighting signal output from the control circuit.

2. The system of claim 1, wherein
   the main lamp further comprises a first semiconductor light emitting element as a light source, and
   the separate lamp further comprises a second semiconductor light emitting element as a light source,
   wherein the first lamp lighting circuit is a first light emitting drive circuit for emitting the first semiconductor light emitting element, and
   the second lamp lighting circuit is a second light emitting drive circuit for emitting the second semiconductor light emitting element, and
   wherein the first light emitting drive circuit has the same configuration as the second light emitting drive circuit.

3. The system of claim 1,
   wherein the separate lamp comprises a first separate lamp and a second separate lamp, wherein the first separate lamp and the second separate lamp uses the same light source, and the light intensity of the first separate lamp is different from that of the second separate lamp,
   wherein the lighting signal output from the control circuit is a modulated signal, and wherein the second lamp lighting circuit is configured to perform the lighting operations of the first separate lamp and the second separate lamp such that the light intensity of the first separate lamp is different from that of the second separate lamp, based on the lighting signal.

4. The system of claim 1,
wherein a common power line is connected to the main lamp and the separate lamp, and
wherein the lighting controller is configured to control ON and OFF of the common power line.

5. The system of claim 4,
wherein the main lamp and the lighting controller are connected to each other by a main lighting control line which transmits the lighting control signal, and
wherein the main lamp and the separate lamp are connected to each other by a secondary lighting control line which transmits the lighting signal.

6. The system of claim 1, wherein the first lamp lighting circuit and the control circuit are integrally configured as a lamp controller.

7. A lighting control system for a vehicle lamp, the system comprising:
a plurality of lamps comprising:
a main lamp; and
a separate lamp which is separated from the main lamp; and
a lighting controller configured to control lighting of the plurality of lamps,
wherein the main lamp comprises:
a first lamp lighting circuit configured to perform a lighting operation of the main lamp; and
a control circuit configured to output a lighting signal based on a lighting control signal output from the lighting controller,
wherein the separate lamp comprises:
a second lamp lighting circuit configured to perform a lighting operation of the separate lamp,
wherein the lighting controller is configured to determine which of a bright, dim or dark environment a vehicle is in and to control the lamps in accordance therewith, and
wherein the first lamp lighting circuit and the second lamp lighting circuit are configured to perform the lighting operations based on the lighting signal output from the control circuit.

8. The system of claim 7, wherein
the main lamp further comprises a first semiconductor light emitting element as a light source, and
the separate lamp further comprises a second semiconductor light emitting element as a light source,
wherein the first lamp lighting circuit is a first light emitting drive circuit for emitting the first semiconductor light emitting element, and
the second lamp lighting circuit is a second light emitting drive circuit for emitting the second semiconductor light emitting element, and
wherein the first light emitting drive circuit has the same configuration as the second light emitting drive circuit.

9. The system of claim 7,
wherein the separate lamp comprises a first separate lamp and a second separate lamp, wherein the first separate lamp and the second separate lamp uses the same light source, and the light intensity of the first separate lamp is different from that of the second separate lamp,
wherein the lighting signal output from the control circuit is a modulated signal, and
wherein the second lamp lighting circuit is configured to perform the lighting operations of the first separate lamp and the second separate lamp such that the light intensity of the first separate lamp is different from that of the second separate lamp, based on the lighting signal.

10. The system of claim 7,
wherein a common power line is connected to the main lamp and the separate lamp, and
wherein the lighting controller is configured to control ON and OFF of the common power line.

11. The system of claim 10,
wherein the main lamp and the lighting controller are connected to each other by a main lighting control line which transmits the lighting control signal, and
wherein the main lamp and the separate lamp are connected to each other by a secondary lighting control line which transmits the lighting signal.

12. The system of claim 7, wherein the first lamp lighting circuit and the control circuit are integrally configured as a lamp controller.

13. A lighting control system for a vehicle lamp, the system comprising:
a plurality of lamps comprising:
a main lamp; and
a separate lamp which is separated from the main lamp; and
a lighting controller configured to control lighting of the plurality of lamps,
wherein the main lamp comprises:
a first lamp lighting circuit configured to perform a lighting operation of the main lamp; and
a control circuit configured to output a lighting signal based on a lighting control signal output from the lighting controller,
wherein the separate lamp comprises:
a second lamp lighting circuit configured to perform a lighting operation of the separate lamp,
wherein the control circuit is in closer proximity to the first lamp lighting circuit than it is to the second lamp lighting circuit, and
wherein the first lamp lighting circuit and the second lamp lighting circuit are configured to perform the lighting operations based on the lighting signal output from the control circuit.

14. The system of claim 13, wherein
the main lamp further comprises a first semiconductor light emitting element as a light source, and
the separate lamp further comprises a second semiconductor light emitting element as a light source,
wherein the first lamp lighting circuit is a first light emitting drive circuit for emitting the first semiconductor light emitting element, and
the second lamp lighting circuit is a second light emitting drive circuit for emitting the second semiconductor light emitting element, and
wherein the first light emitting drive circuit has the same configuration as the second light emitting drive circuit.

15. The system of claim 13,
wherein the separate lamp comprises a first separate lamp and a second separate lamp, wherein the first separate lamp and the second separate lamp uses the same light source, and the light intensity of the first separate lamp is different from that of the second separate lamp,
wherein the lighting signal output from the control circuit is a modulated signal, and
wherein the second lamp lighting circuit is configured to perform the lighting operations of the first separate lamp and the second separate lamp such that the light intensity of the first separate lamp is different from that of the second separate lamp, based on the lighting signal.

16. The system of claim 13,
wherein a common power line is connected to the main lamp and the separate lamp, and
wherein the lighting controller is configured to control ON and OFF of the common power line.

17. The system of claim 16,
wherein the main lamp and the lighting controller are connected to each other by a main lighting control line which transmits the lighting control signal, and
wherein the main lamp and the separate lamp are connected to each other by a secondary lighting control line which transmits the lighting signal.

18. The system of claim 13, wherein the first lamp lighting circuit and the control circuit are integrally configured as a lamp controller.

* * * * *